United States Patent [19]

Khoshaba

[11] 4,008,900
[45] Feb. 22, 1977

[54] INDEXING CHUCK

[75] Inventor: Mushie Khoshaba, Elk Grove Village, Ill.

[73] Assignee: John Freedom, Chicago, Ill. ; a part interest

[22] Filed: Mar. 15, 1976

[21] Appl. No.: 666,965

[52] U.S. Cl. .............................. 279/5; 74/813 L; 74/817; 90/57; 269/66

[51] Int. Cl.[2] .................. B23B 31/34; B23Q 17/18

[58] Field of Search .......... 279/5; 90/57; 74/813 L, 74/817; 269/66

[56] References Cited

UNITED STATES PATENTS

| | | | |
|---|---|---|---|
| 2,621,937 | 12/1952 | Hunzikee | 279/5 |
| 3,083,024 | 3/1963 | Herbkersman | 279/5 |

FOREIGN PATENTS OR APPLICATIONS

| | | | |
|---|---|---|---|
| 244,085 | 5/1969 | U.S.S.R. | 74/813 L |

*Primary Examiner*—Othell M. Simpson
*Assistant Examiner*—Z. R. Bilinsky
*Attorney, Agent, or Firm*—Dominik, Knechtel, Godula & Demeur

[57] ABSTRACT

An indexing chuck assembly to hold a work piece so work may be performed on it in differently rotated positions, as on a lathe. The chuck block is rotated between a lifting arm and a table member, the bottom of the chuck block having a cammed shaft which moves both rotationally and linearly as the chuck block is raised and lowered by the lifting arm. The cam shaft has a plurality of yoke cam grooves which engage a biased cam follower in the table member whereby the cam follower follows a reversing cam path defined by the plurality of yokes, each yoke forming a pair of angular grooves in the configuration of a Y, a portion of each yoke being common to its adjoining yoke so that adjoining Y configurations are alternately reversed. Each yoke is defined by an upper pair of aligned rest stops and an intermediate lowered reverse stop, the cam follower imparting rotation to the chuck block as it moves in transit from one rest stop to the adjoining rest stop.

10 Claims, 13 Drawing Figures

INDEXING CHUCK

BACKGROUND OF THE INVENTION

This invention relates to indexing tools generally, and an indexing chuck particularly. The invention relates still more particularly to a cam shaft disposed at the bottom of a chuck block which engages a cam follower to impart rotational movement to the chuck block and the work piece it holds.

Indexing chuck assemblies have been the subject of efforts for improvement in the art, and such chuck assemblies are generally provided as part of work performing machines, such as a lathe. All these attempts provide a chuck head which conventionally mounts or holds a work piece, and means are provided for rotating the chuck head to predetermined degrees, usually 90°, so that work may be performed on different locations of the work piece.

Representative efforts in the art which provide various means for rotating such a chuck head may be found in U.S. Pat. Nos. such as 2,621,937; 3,630,536 and 3,880,437.

OBJECTS AND ADVANTAGES OF THE INVENTION

It is an object of the present invention to provide an improved indexing chuck assembly in which various rotational movements to a chuck head are imparted by uniquely combined compound movements which do not require undue number of separate and working parts, nor which encounter problems and complexities associated with such a multiplication of parts.

Another object of the invention is to provide an improved indexing chuck assembly used with work performing machines, such as lathes, where simple lowering and raising of the chuck head results in imparting precise rotation to the chuck head by the engagement of a cam follower with a one-way but reversing cam path on a stub shaft below the chuck head.

Yet another object of the present invention is an improved indexing chuck assembly wherein a stub shaft at the bottom of an indexing chuck head is moved rotationally and linearly when the chuck head is raised by a lifting arm which follows a curvilinear path, such combination of movements requiring relatively few parts which perform reliably and precisely to rotate a workpiece.

Yet another object of the present invention is an improved indexing chuck assembly wherein a combination of rotational and linear movement of a cammed shaft at the bottom of a chuck head can be simply devised to provide one or more rotational positions to the chuck head by the simple expedient of altering the number of sets of yoked cam grooves radially disposed along the periphery of the stub shaft, the lifting and lowering motions of the assembly remaining unchanged for such various alterations.

DESCRIPTION OF THE VIEWS OF THE DRAWINGS

The foregoing objects and advantages are realized by the present invention, together with still other objects and advantages which will occur to practitioners, when considering the following disclosure which includes drawings as follows.

SUMMARY OF THE INVENTION

A chuck head or block is provided with engaging means at the top so lifting means may be connected to lower and raise the chuck head. The chuck head may be raised and lowered by various motions and means, but a preferred procedure is the use of a pivotable lifting arm which is activated to turn around a pivot so that the arm generates curvilinear motion as it is tilted. The lifting motion to the chuck head is still linear because means are provided at the end of the lift arm engaging means to slide relative to the end of the lift arm.

The bottom of the chuck head is provided with a stub shaft which moves in a bore in a table member that supports the chuck head. A spring urged bearing element or cam follower communicates with the bore and engages a one-way but reversing cam path formed radially in the periphery of the shaft. A plurality of cam groove yokes are disposed around the shaft, the yokes being alternately reversed in adjoining relationship so that the cam follower contacts a bottomed rest stop towards the top of the shaft in one yoke, and then contacts a bottomed reverse stop in the adjoining yoke set which is alternately reversed in configuration. The result is a one-way, reversing cam path. Raising and lowering the chuck block results in imparting rotation to the chuck block as the cam follower follows the reversing cam path.

In executing one rotational movement, the cam follower moves from a rest stop in one yoke to a reverse stop and rest stop in an adjoining yoke. The angular grooves of each yoke are so dimensioned and spaced that a transit from one rest stop to an adjoining rest stop can rotate the chuck head a predetermined distance, preferably 90°.

DETAILED DESCRIPTION OF THE INVENTION

Figure 1:
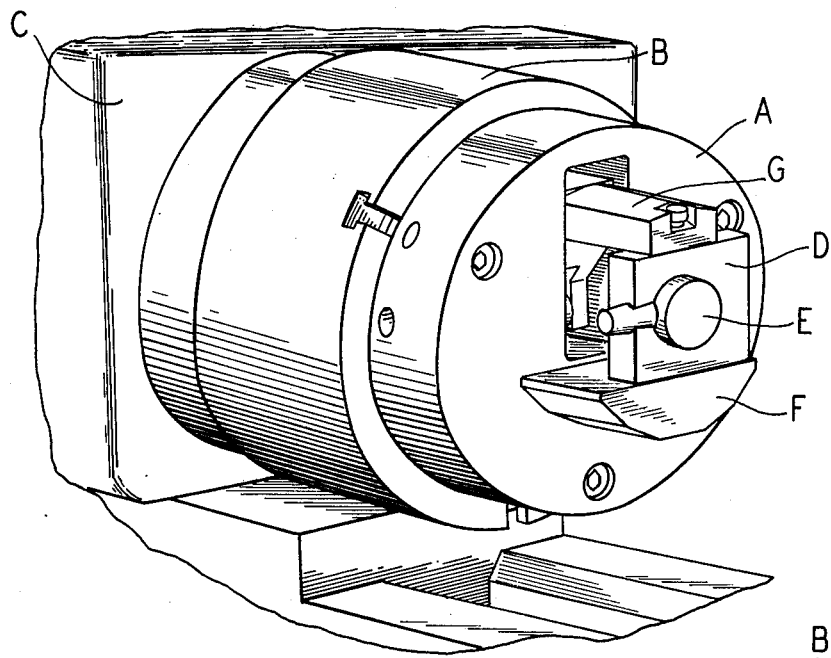
FIG. 1 is a portional perspective view showing the indexing assembly mounted to a part of a work performing machine.

Looking at FIG. 1, the principal parts of the indexing chuck assembly are illustrated and include a body member A and a housing B in which is located an actuating mechanism to operate lifting means partly enclosed in body member A. The housing B is shown fixed to a support portion C of a work performing machine, which may be an automatic lathe such as a Sheldon Tape controlled lathe.

More particularly, the indexing chuck assembly includes an indexing chuck D shown mounting a workpiece E in one of its multiple positions so that work can be performed, such as tapping a threaded bore. The indexing chuck D is supported on a table member F, and a lift arm G is operated by actuating means, to be later described, which raise and lower the chuck head D.

Figure 2:
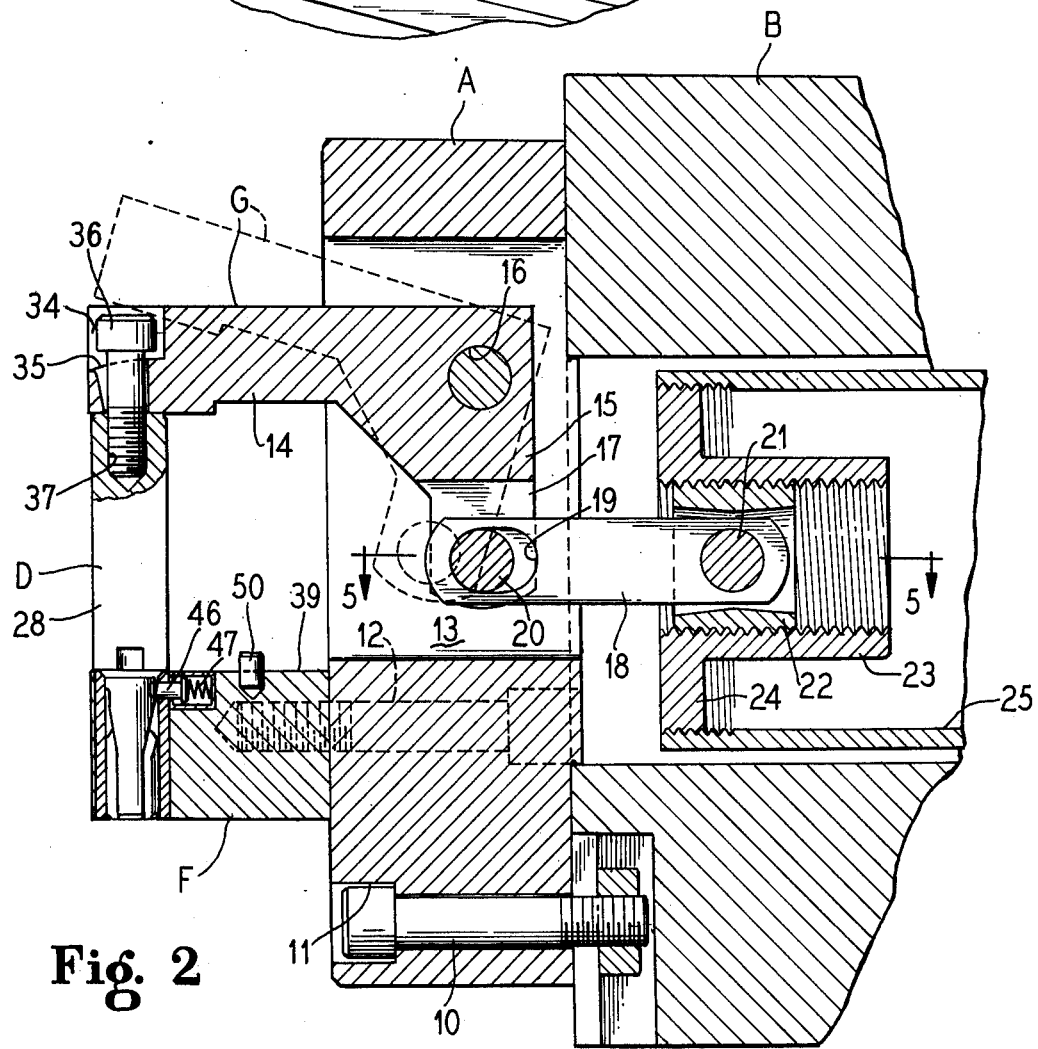
FIG. 2 is a side sectional view of the indexing chuck assembly, on an enlarged scale.

Further details may be seen from the enlarged sectional view of FIG. 2. A bolt assembly shown generally as 10 is shown countersunk at 11, and this bolt assembly fixes the body A to the housing portion B. Another bolt assembly, shown collectively as 12, is seen as holding table support F to the body A. A common passageway, indicated at 13, extends from housing B, through body A and between the table support member F and lift arm G.

Figure 5:
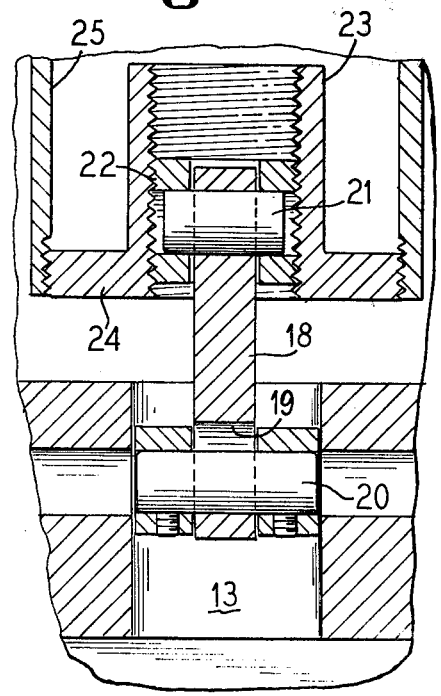
FIG. 5 is a portional sectional view taken along line 5—5 of FIG. 2.
Figure 7:
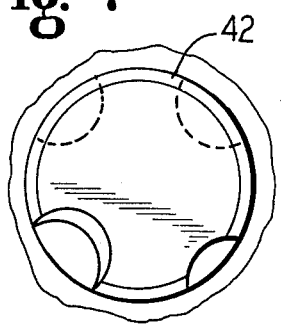
FIG. 7 is a view taken along line 7—7 of FIG. 6, it being assumed FIG. 6 relates to the cylindrical shaft, for purposes of the view line.
Figure 8:
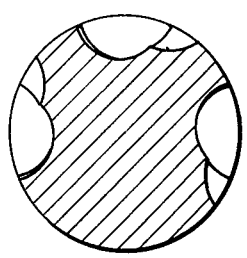
FIG. 8 is a sectional view taken along line 8—8, based on the same assumption as that of FIG. 7.
Figure 9:
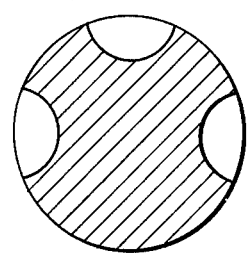
FIG. 9 is a sectional view taken along line 9—9, based on the same assumption as that of FIGS. 7 and 8.

The lift arm G includes a horizontal arm part 14 and a vertical arm 15, such terms being used relative to the common axis of the passageway 13. The illustrated lift arm is in the form of an angle with the pivot 16 shown at the corner of the angle. The bottom of the vertical arm 15 has a cut-out portion 17 and in this portion is received the stem or rod 18 of the actuating mechanism. The forward end of the stem, relative to the chuck head D, has an oversized opening 19. A connecting pin 20 extends through the opening 19 to opposite arm portions which define the cutout, see FIG. 5. The oversized opening provides some lost motion when the stem 18 is actuated to move the arm so it tilts around pivot 16, as indicated in phantom in FIG. 2.

The other end of the stem 18 has a connector pin 21 which extends through an opening in the stem, not identified by a numeral. The pin is disposed within cylindrical nut member 22 which threadably engages internally threaded cylindrical member 23, having an outer threaded forward flange 24. The flange is threadably engaged to an internally threaded sleeve 25. The various parts and their threads provide adjustment of the actuating mechanism, which will be evident.

Figure 3:
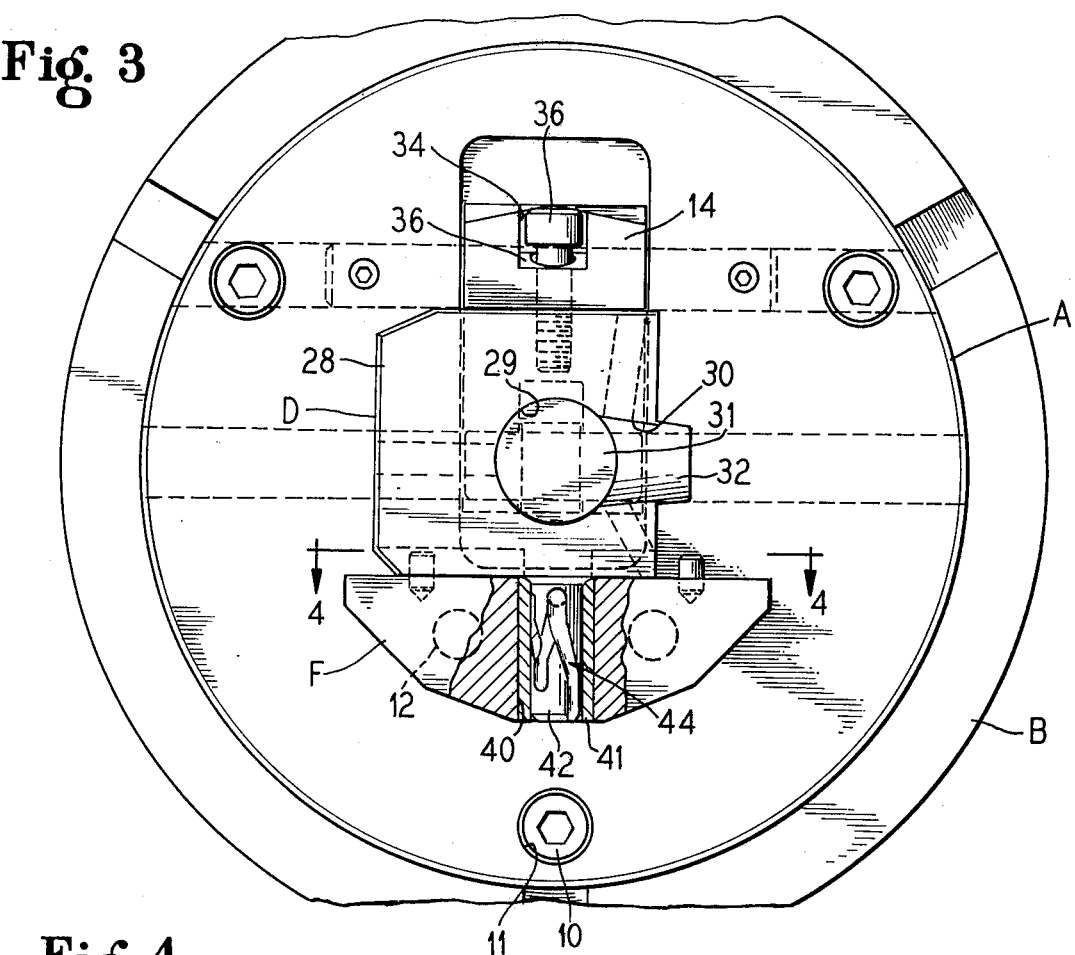
FIG. 3 is a front elevational view of the indexing chuck assembly, partly in section, and on the same scale as that of FIG. 2.

Referring still to FIG. 2, as well as following FIG. 3, the indexing chuck head D is shown in the form of a block 28, in the form of a parallelopiped. The block is shown with a central opening 29 communicating with a side opening 30. This particular opening is designed to receive a workpiece of similar configuration, such workpiece shown to have a cylindrical body member 31 and a side conical body member 32. Work may be performed on one side of the cylindrical body member 31, then the chuck head may be rotated so that work is done on the conical body member 32, and the chuck may then be again rotated so that the work may be done on the reverse side of the cylindrical body member 31.

Referring again to the horizontal part 14 of the lift arm G, the front end is provided with a void shown as an open slot 34. The open slot has curved shoulders 35 which flank the head of a screw fastener 36. The screw fastener is mounted to threaded bore 37 in the top of the block 28. This connects the lift arm to the chuck head and the void allows relative sliding movement between the head of the screw 36 and the shoulders 35 when the motion of the arm generates a curvilinear path as a result of the pivot 16. This relative sliding movement allows the chuck head to be raised linearly, or along a vertical path, relative to the common axis of the passageway 13.

The block 28 is operatively moved between the lift arm G and the table support member F. Such table support member has an upper flat top or planar surface 39, and the bottom of the block 28 is supported on this surface. A table bore 40 is shown extending between the planar surface 39 and the bottom of the table member. An annular bearing member 41 is within the table bore, and a cam grooved stub shaft 42 follows linear and rotational motion within the annular bearing member 41. The stub shaft 42 is fixed to the bottom of the block 28, and such stub shaft has a plurality of yoke grooves positioned radially along its periphery, one of such yokes being indicated generally at 44.

A bearing element or cam follower 46 is provided to ride the path of the cam grooves which make up the yoke set 44, as well as other yoke sets on the stub shaft. Such bearing element is shown as an engaging pin which is urged by spring 47 against the cam groove, the spring being shown within well 48 in the top of the table member F. The pin extends through an aperture, which is not numbered, into the table bore 40. As the block 28 is raised and lowered, the bearing element 46 follows a reversing path of the cam grooves which make up the yoke. This imparts rotation to the block 28. This will be described later in greater detail.

Looking again at the planar surface 39 of the table member F, there is seen a plurality of fixed locator pins 50. Three pins are shown, spaced from one another by 90°. The bottom of the block 28 has a cooperative locator recess shown as a linear groove 52 which extends between sidewalls 54, 55 of block 28, and opens at end wall 56. Groove 52 has a blind end where stub shaft 42 is joined to the bottom of the block 28. On the other side of the shaft is found another linear groove, not numbered, which open end communicates with the opposite end wall 57 of the block.

Figure 4:
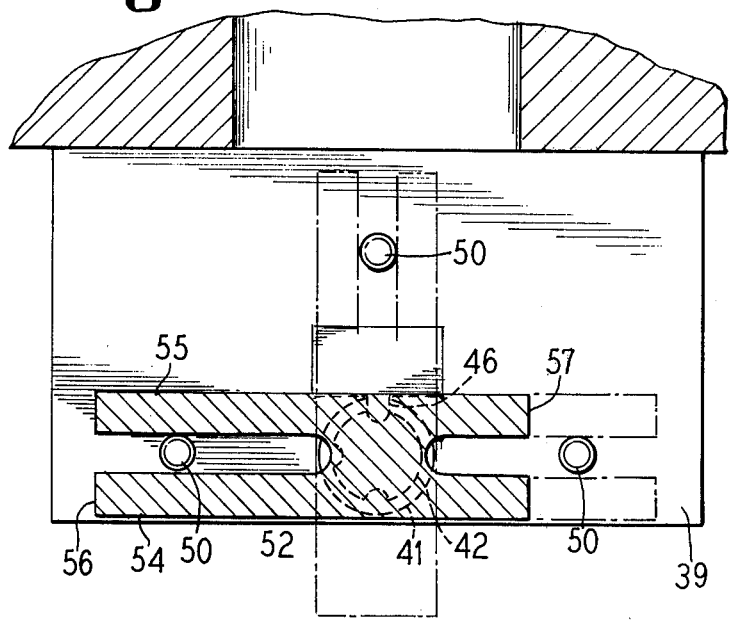
FIG. 4 is a sectional view taken along line 4—4 of FIG. 3, but on a slightly enlarged scale.

Groove 52 engages one of the locator pins 50 to fix the rotated position of the block in the positions illustrated in FIGS. 3 and 4. The block 28 is raised, rotated and lowered. The groove then engages another locator pin 90° from the position as shown, such first rotated position indicated in phantom in the view of FIG. 4. Raising, rotating and lowering the block then engages linear groove 52 with the last locator pin, which position is 180° from the originally illustrated position, such final position also shown in phantom in the view of FIG. 4.

Figure 6:
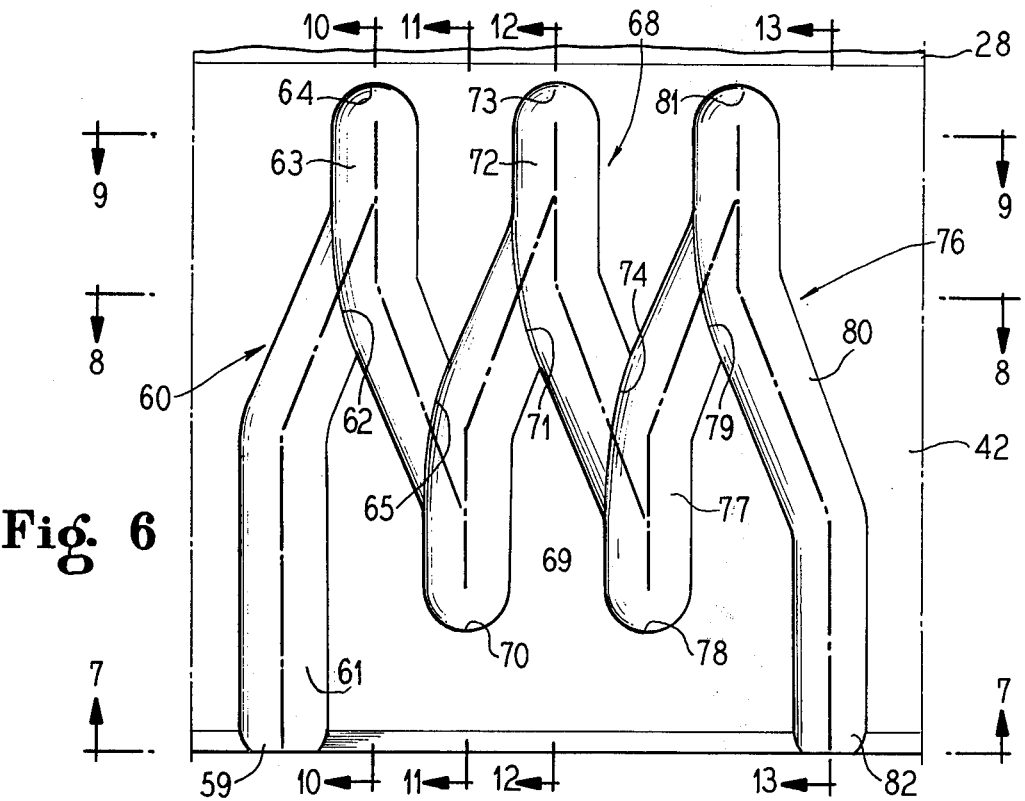
FIG. 6 is a planar representation of a cylindrical stub shaft showing the cammed groove path which in actual form is disposed radially along the periphery of the shaft.
Figure 10:
FIG. 10 is a portional sectional view taken along line 10—10 of FIG. 6, with the same assumption operating as in the foregoing FIGS. 7-9.
Figure 11:
FIG. 11 is a sectional view taken along line 11—11 in the view of FIG. 6, the assumption being similar to that of FIG. 10.
Figure 12:
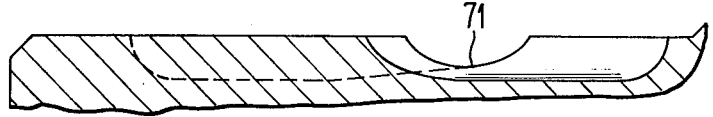
FIG. 12 is a sectional view taken along line 12—12 of FIG. 2, based on a similar assumption as that of FIG. 10.
Figure 13:
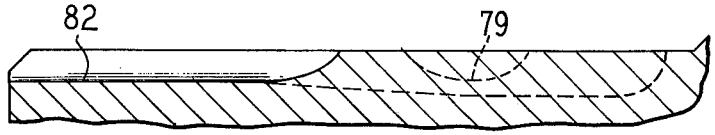
FIG. 13 is a sectional view taken along line 13—13 of FIG. 6, based on the same assumption as that of FIG. 10.

Reference is now made to the view of FIG. 6 and the remaining views of the drawing. As described previously, the view of FIG. 6 shows the reversing cam path in planar representation, that is, the continuous radial wall of the shaft has been flattened so the entire cam path can be illustrated. The shaft includes plural sets of cam yokes, each yoke assuming the familiar Y configuration. The bearing pin 46 may enter the cam path through entry 59 which opens at the bottom of the shaft. The bearing element would enter the first or initiating cam yoke 60, particularly angled groove 61 which is extended to the entry 59 at the bottom of the shaft.

Each yoke comprises a pair of angular grooves, and each angular groove includes a straight branch which is parallel to the axis of the shaft and an angular branch which forms an angle with such axis. In each yoke, one angular groove may be considered as the inverted and reversed form of the other angular groove in the same yoke. It will further be seen that adjoining yokes share a common angular groove. Examining the one-way and reversing cam path in greater detail, it is seen that the cam follower will move through entry 59 upwardly through angular groove 61. The cam follower will then pass through one-way cam drop 62 into a continued upward path in angular groove 63. The cam follower will continue its upward path until it reaches bottom rest stop 64. This will represent the block 28 as being seated on surface 39 of the table member in a first assumed or rotated position, as shown in FIGS. 3 and 4.

When it is desired to rotate the block 28, lift arm G will be actuated and the cam follower will follow a downward path along groove 63 but will not re-enter groove 61 because of the one-way cam drop 62. The cam follower will continue past cam drop 65 into groove 69 and continue in a downward path to bottom reverse stop 70. This will represent the end of the upward path of the block 28 raised by lift arm G. The lift arm will then be lowered and the cam follower will move upwardly along angular groove 69 but will not re-enter groove 63 because of cam drop 65. The cam follower will continue its upward path past cam drop 71 into cam groove 72 until it reaches bottomed rest stop 73. This will represent the block fully lowered and in rotated position, 90° from the original position. Angular grooves 69 and 72 may be viewed as comprising a yoke shown generally as 68.

Raising the lift arm and block 28 will result in the cam follower following the downward path along groove 72, but it will not re-enter cam group 69 because of one-way cam drop 71. The cam follower will move past cam drop 74 into a yoke set shown generally as 76, particularly angular groove 77 thereof. The cam follower will bottom in reverse stop 78, and this will represent the fully raised position of the block in the lift arm G. Lowering the lift arm and the block will urge the cam follower to move upwardly in angular groove 77, past one-way cam drop 79 and into angular groove 80 where it continues its upward path to bottomed rest stop 81. This will represent the completely rotated position of the block 28 that is 90° from the previous position. If it is desired to remove the stub shaft from the table bore 40, the lift arm is again actuated to raise the block 28 and start the cam follower on its downward path along angular groove 80 which is extended into exit 82 which opens at the bottom of the shaft. The cam follower will then leave the continuous path, and the stub shaft may be repositioned for a succeeding workpiece.

The claims of the invention are now presented and the terms of such claims will be further understood by reference to the language of the preceding specification and the views of the drawing.

What is claimed is:

1. An indexing chuck assembly which includes, in combination,
   raising means,
   means to actuate said raising means,
   a chuck block, a workpiece mounting passageway in said chuck block,
   fastening means at the top of said chuck block to engage said raising means,
   a cammed shaft extending downwardly at the bottom of said chuck block, said shaft having a plurality of grooved cam yokes, a communicating and reversing one-way cam path formed with adjoining yokes, each yoke formed by angular grooves joined in a Y configuration, alternating Y configurations being reversed relative to each other and adjoining yokes having common angular grooves, each angular groove having a straight branch substantially parallel to the axis of the shaft and an angular branch forming an angle with said axis of the shaft, the angular branch of a first groove forming a junction with the second groove in a yoke, a one-way cam drop at said junction into an upward cam path of the second groove, a bottomed stop at the end of the straight branch, the angular branch of the second groove forming a junction with a first groove of an adjoining yoke, a one-way cam drop at said junction into a downward cam path, the bottom stop in one yoke being a rest stop towards the top of the shaft, and the bottomed stop in the adjoining yoke being a reverse stop towards the bottom of the shaft,
   a flat table member to support the bottom of the chuck block,
   a bore in said table member to rotatably receive said cam shaft,
   a cam follower in said table member and communicating with the said bore, and
   means urging said cam follower into sliding engagement with the angular cammed grooves
   whereby raising said chuck body imparts rotation to said chuck body as the bearing element follows a reversing cam path from a rest stop position, through a reverse stop position, and a rest stop position in the adjoining yoke.

2. An indexing chuck assembly which includes the features of claim 1 wherein an initiating yoke has an extended groove opening at the bottom of the shaft to provide entry for the cam follower into the cam path, and a terminating yoke has an extended cam groove opening at the bottom of the shaft to permit exit of the cam follower.

3. An indexing chuck assembly which includes the features of claim 1 wherein the angular grooves are dimensioned and radially disposed along the periphery of the shaft so that a rest stop to rest stop transit of the cam follower imparts a 90° rotation to the chuck block.

4. An indexing chuck assembly which includes the features of claim 3 wherein the cam shaft has three yoke sets to impart two 90° rotations in two rest stop to rest stop transits along the reversing cam path which, with the initial rest stop position, allows the indexing chuck assembly to present three positions for work to be performed on the workpiece.

5. An indexing chuck assembly which includes the features of claim 1 wherein the bottom of said chuck block has a locator recess and, wherein said flat table member includes a plurality of projecting and fixed locator elements positioned to engage said locator recess when the raised and rotated chuck block is lowered and the cam follower is at the rest stop position of a yoke.

6. An indexing chuck assembly which includes the features of claim 1, wherein said raising means is pivotable lift arm and an end of said lift arm being joined to the top of the chuck block by a removable fastener, the end of said lift arm having a void to permit relative sliding movement between the fastener and the lift arm when such lift arm follows a curvilinear path in being raised and lowered.

7. An indexing chuck assembly which includes the features of claim 6 wherein said pivotable lift arm is a right angle body member, a pivot formed at said angle, a horizontal arm having an end engaging the top of said chuck block and a vertical arm which, when actuated, tilts the horizontal arm upwardly and downwardly around said pivot.

8. An indexing chuck assembly which includes the features of claim 7 wherein said plurality of yokes include an initiating yoke having an extending groove opening at the bottom of the shaft for entry of the cam follower bearing element and a terminating yoke having an extending groove opening at the bottom of the shaft for exit of the cam follower, and wherein the extending grooves, together with four intermediate angular grooves, provide three yokes which impart three rotated working positions to the chuck head, the first position reached when the cam follower is at the first stop rest of the first yoke, the second position being 90° from the first portion and being reached when the cam follower is at the second stop rest, and a third position being 90° from the second position when the cam follower is at the third stop rest.

9. An indexing chuck assembly which includes the features of claim 8 wherein the bottom of said chuck block has a linear locator groove extending towards the top and bottom of the chuck block, and the flat surface of said table member has three fixed locator pins spaced 90° from one another so that the linear groove may engage the pin to locate the chuck block in one of its three rotated positions.

10. An indexing chuck assembly which includes the features of claim 9 wherein said cam follower is a bearing element extending into the table bore, and a spring within a well in the table member uring the bearing element against the cam shaft in the table bore.

* * * * *